June 17, 1941. J. N. KIEP 2,245,684
HYDRAULIC COUPLING
Filed July 8, 1939 3 Sheets-Sheet 1
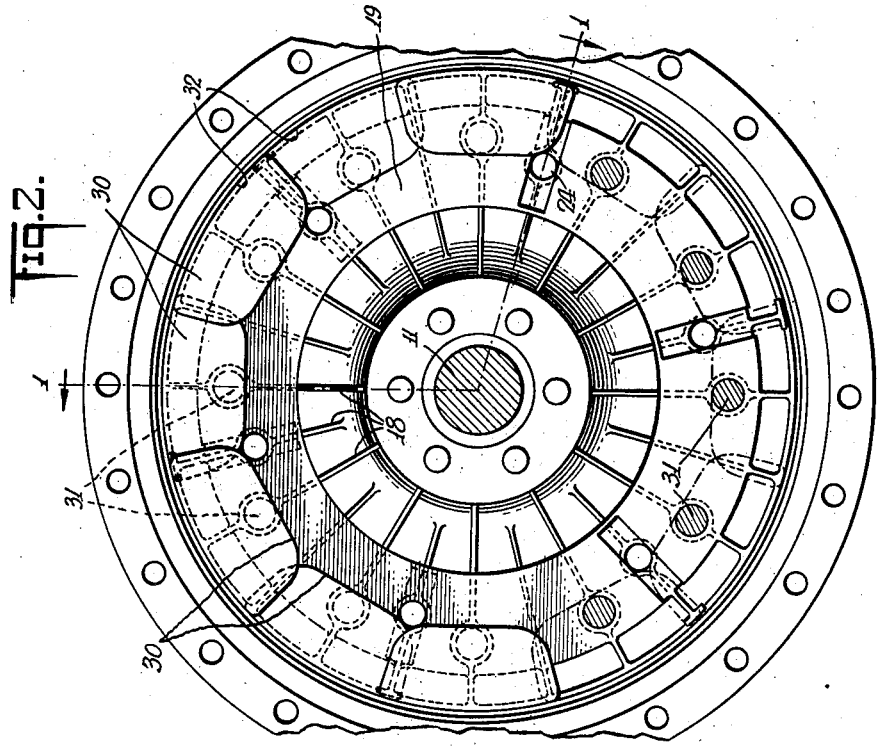
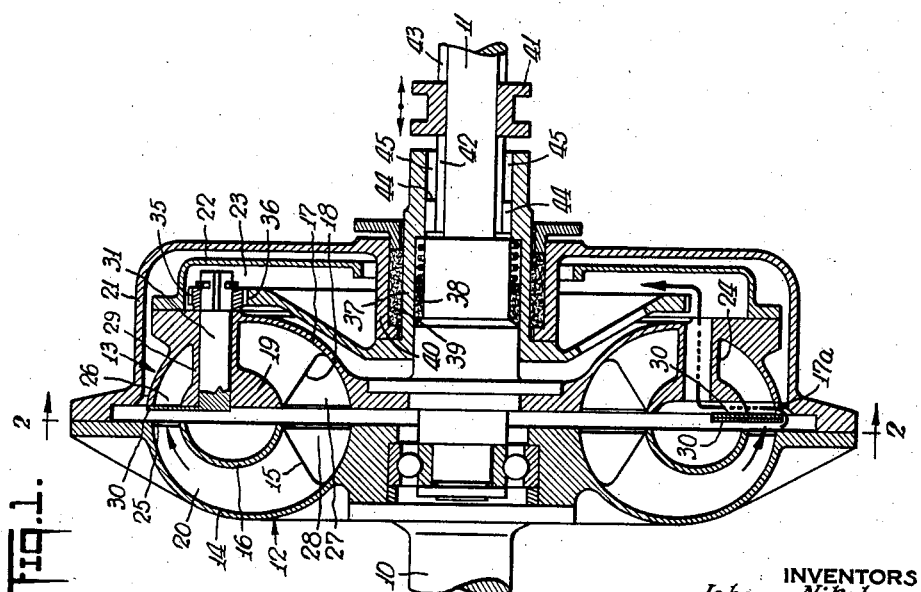
INVENTORS
Johann Nikolaus Kiep
BY
ATTORNEYS

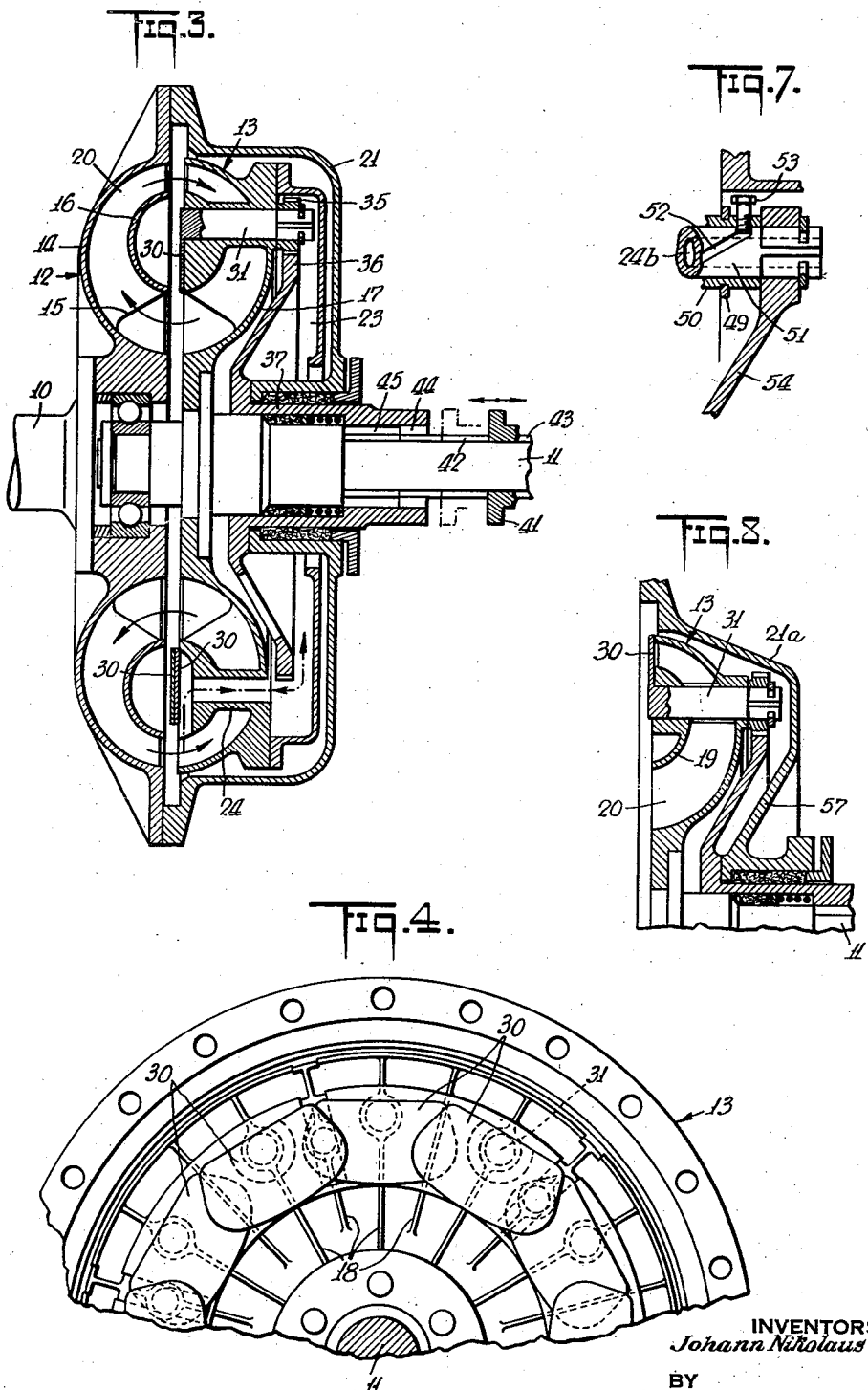

June 17, 1941.    J. N. KIEP    2,245,684
HYDRAULIC COUPLING
Filed July 8, 1939    3 Sheets-Sheet 3
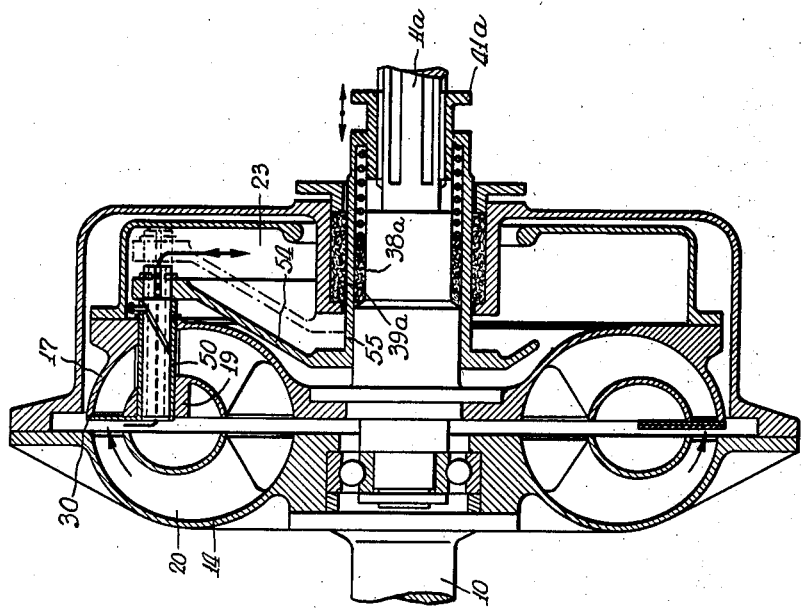
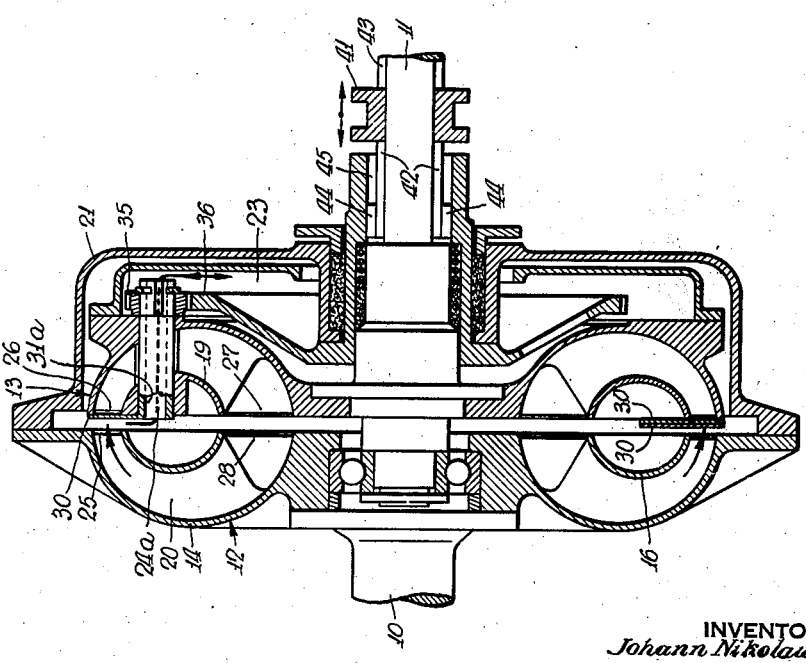
INVENTORS
Johann Nikolaus Kiep
BY
Dean Fairbank & Hirsch
ATTORNEYS Patented June 17, 1941

2,245,684

UNITED STATES PATENT OFFICE 2,245,684

HYDRAULIC COUPLING

Johann Nikolaus Kiep, Hamburg, Germany, assignor to Deschimag, Bremen, Germany, a corporation of Germany Application July 8, 1939, Serial No. 283,359
In Germany July 28, 1938

10 Claims. (Cl. 60—54)

The present invention relates to hydraulic couplings of the Föttinger or Vulcan kinetic type, comprising opposed impeller and runner members, each having an outer dished shell, and a series of radial vanes or ribs, and conjointly defining a working circuit in which the impelling liquid circulates.

In one form of hydraulic coupling of this type, such as shown in Patents Nos. 1,963,720 and 2,011,735, reduction in the transmission of power through the coupling is effected by reducing or eliminating the liquid in the circuit. In this type, the coupling is provided with a receiver, rotatable with the impeller or runner, and capable of holding at least part of the liquid contents of the working circuit, and means for transferring liquid automatically between said circuit and said receiver. If the rotation of the runner or driven shaft is greatly retarded or arrested, the resultant reduction in centrifugal force on the impelling liquid causes it to discharge from the circuit into said receiver. In this type of coupling, complete interruption of power transmission therethrough is not possible, unless perhaps the rotation of the runner is so greatly retarded or arrested as to effect almost complete evacuation of the working circuit.

In another form of hydraulic coupling shown in Patent No. 1,831,700, reduction or interruption in the transmission of power therethrough is effected by checking circulation of liquid in the working circuit. In this type, the impeller or runner carries an annular slide valve, movable axially into the passage of the working circuit to block circulation of the impelling liquid in said circuit.

In this type of coupling, the annular valve in blocking position does not prevent local circulation of the impelling liquid between the coupling halves at the radially inner and outer sections of the working circuit. Because of the greater centrifugal force of the liquid acting locally at the radially outer section of the working circuit from the outlet of the impeller to the inlet of the runner, a substantial dragging torque is transmitted to said runner by said liquid as long as the impeller rotates.

One object of the present invention is to provide a more complete interruption in the transmission of power through the coupling than is possible with couplings of the type above referred to, and to more effectively retard or stop rotation of the runner.

As a feature of the present invention, mechanically and positively controlled valve means are provided for blocking circulation of impelling liquid between the outlet of the impeller and the opposed inlet of the runner.

As a further feature, said valve means is embodied in a hydraulic coupling of the receiver type, so that the blocking operation above referred to is supplemented by discharge of the impelling liquid from the circuit, to assure a more complete interruption of power transmission through said coupling.

Various other objects, features and advantages of the invention will be apparent from the following particular description, and from an inspection of the accompanying drawings, in which:

Fig. 1 is a radial section taken on line 1—1 of Fig. 2, and showing one form of receiver coupling embodying the present invention, with the valve means shown in closed position to block circulation of liquid in the working circuit, Fig. 2 is an inside elevation of one of the coupling halves of Fig. 1, Fig. 3 is a radial section similar to that of Fig. 1, but showing the valve means in open position to permit free circulation of the impelling liquid in the circuit, Fig. 4 is a fragmentary inside elevation similar to that of Fig. 2, but showing the valve means in the open position shown in Fig. 3 and of slightly different form from that shown in Fig. 2, Figs. 5 and 6 are radial sections respectively of two other forms of receiver couplings, embodying the present invention, Fig. 7 is a fragmentary radial section constituting an enlargement of a part of Fig. 6, and Fig. 8 is a fragmentary radial section showing incorporation of the present invention in a coupling not of the receiver type.

In the form of invention shown in Figs. 1 to 4, the impeller includes a drive shaft 10, a driven shaft 11, an impeller member 12, and a runner member 13, said members being connected to said shafts respectively for rotation therewith. The impeller member 12 comprises a dished shell 14, with radially extending vanes 15, and an annular core ring section 16, and the running member 13 comprises a dished shell 17 with radially extending vanes 18, and an annular core ring section 19. The two members 12 and 13 are juxtaposed to form a working circuit 20 for the impelling liquid, with the two core sections 16 and 19 forming a core or guide for the circulating liquid, and defining a chamber therebetween communicating with the working circuit 20.

Fixed to the runner shell 17 is a member 22, defining with the outer side of said shell a receiver 23, which is enclosed in an outer casing 21 fixed to the periphery of the impeller 12. Extending between this reservoir 23 and the chamber formed in the interior of the core rings 16, 19 are ducts 24 for transferring liquid between said reservoir and the working circuit 20 automatically, in accordance with variations in operating conditions as described in said Patent No. 2,011,735. With the impeller 12 and runner 13 rotating at substantially the same speed, the working circuit 20 is filled to the maximum extent, and there is no passage of liquid through the ducts 24. When the speed of the runner 13 with respect to the impeller 12 is reduced, the liquid will flow through the ducts 24 from the working circuit 20 to the receiver 23 to cause partial evacuation of said circuit. When the runner 13 is accelerated, flow of liquid through the ducts 24 will be reversed to fill the core chamber, and in turn the working circuit until the speed of said runner approaches that of the impeller.

As an important feature of our invention, valve means are provided for blocking circulation of liquid in the circuit 20 from the impeller outlet to the runner inlet. In the specific form illustrated, such means comprises a series of substantially flat plates 30, arranged in an annular series between the two core ring sections 16 and 19, and each connected at one end of a spindle 31. These spindles 31 are journalled at circumferentially spaced intervals in one of the core ring sections as for instance section 19 of the runner, by means of bearing sleeves 29, shown integral with and extending between said core ring section and the runner shell 17.

The valve plates 30 have their edges 32 of circular contour, conforming substantially with the contour of the runner shell 17 at the radially outer periphery of the working chamber 20, and are of such radial dimension and are so placed, that in closed position shown in Figs. 1 and 2, they extend substantially fully across that section of the working circuit between the impeller outlet 25 and runner inlet 26, to block passage of working liquid from the impeller to the runner at said section. In the form shown, the junction between the two halves of the coupling extends in the plane substantially at right angles to the axis of the coupling, so that the section referred to is at the radially outer section of the working circuit between the core rings 16, 19 and the outer periphery of said circuit. In the open position shown in Figs. 3 and 4, with the valve plates 30 rotated 180° from said closed position shown in Figs. 1 and 2, said valve plates will be entirely in the core, and will not extend into the radially inner section of the working circuit between the runner outlet 27 and the impeller inlet 28, so that passage of liquid through said latter section will remain unobstructed.

The valve plates 30 are desirably long enough to overlap slightly at their ends to assure complete annular blocking of the circuit passage, and are relatively displaced a short distance in different planes to permit this overlap without interfering with the turning of said plates between open and closed position.

In order to assure flow communication between the working circuit 20 and the core chamber in closed position of the valve plates, the outer peripheral section of the runner shell 17 is provided with notches 17a.

In the form shown in Figs. 1 to 4, the means for rotating the valve plates 30 in unison into open or closed position comprises pinions 35, fixed to the outer ends of spindles 31 respectively, and all meshing with a large central spur gear 36, having a hub flange 37, which encircles the driven shaft 11, and which has suitable packing connections 38 and 39 with said shaft, and with an inward annular flange 40 of the cover 21. Axially slidable on the driven shaft 11 is a control member in the form of a sleeve 41, having secured thereto one or more gear turning bars 42, each guided in a shaft slot 43, which is parallel to the shaft axis, and which also serves as a keyway for said sleeve. Secured to the bar 42 is a lug 44, extending in an inclined or helical slot 45 formed in the hub flange 37 of the gear 36, so that axial movement of the sleeve 41 causes rotation of said gear, and in turn rotation of the valve plates 30 through the pinions 35. In slide position of the sleeve 41 shown in Fig. 1, the valve plates 30 will be in closed blocking position shown in Figs. 1 and 2, and in slide position shown in Fig. 3, said valve plates will be in open position shown in Figs. 3 and 4. Suitable means (not shown) are provided for axially shifting the sleeve 41 as indicated, and desirably for predetermining its slide position for proper opening or closing action of the valve plates 30.

In the operation of the coupling, when it is desired to interrupt transmission of power to the driven shaft without stopping the drive shaft 10, the sleeve 41 is shifted to move the plates 30 to closed position as indicated. In this closed position, the valve plates 30 prevent not only circulation of the working liquid around the circuit 20, but also prevent local circulation between the impeller outlet and the runner inlet at the radially outer section of said circuit. Thus no dragging torque is transmitted to the runner as the result of such local circulation.

Since flow communication between the core chamber of the rings 16 and 19 and the working circuit is not interrupted in closed position of the valve plates 30, retardation of the runner 13 effected by the blocking action of said plates causes discharge of liquid into the receiver 23 through the ducts 24, so that there is at least partial evacuation of the working circuit 20. This evacuation, in conjunction with the blocking effect of the valve plates 30, greatly retards or arrests rotation of the runner 13, and assures almost complete interruption of the power transmission through the coupling.

The operation of the valve plates 30 may be arranged, so that they may assume intermediate positions between the extreme positions shown in Figs. 2 and 4, to effect any desired degree of blocking or covering action. This makes it possible to effect control of the speed of the runner 13 without changing the speed of the impeller.

In Fig. 5 is shown another form of construction, in which the spindles 31a corresponding to the spindles 31 of the construction of Figs. 1 to 4 are hollow to form ducts 24a for the liquid between the core chamber and the receiver 23, so that the special ducts 24 of Figs. 1 to 4 are eliminated. Furthermore, in the construction of Fig. 5, no special bearing sleeves are provided for the spindles 31a, corresponding to the sleeves 29 of the construction of Figs. 1 to 4. It is seen therefore that the construction of Fig. 5 is simpler than that of Figs. 1 to 4, and has greater circuit volume as the result of the elimination of the parts indicated.

In the form of coupling shown in Figs. 6 and 7, the cover or valve plates 30 are connected to the inner ends of hollow spindles 50 respectively, journalled in the core ring section 19 of the runner shell 17, and held against axial movement by said plates and by a suitable collar 49. Axially slidable in each of these hollow spindles 50 is a hollow rod 51, forming a duct 24b for passage of liquid between the core chamber and the receiver 23, and having a helical or inclined groove 52, into which extends a pin 53, threaded or otherwise secured to the spindle 50. Connected to the outer ends of the rods 51 is a frame member shown in the form of a disc 54, having a hub 55 encircling the driven or runner shaft 11a, and terminating in a control sleeve 41a, splined to said shaft for axial movement therealong. Suitable packings 38a and 39a are provided on the inner and outer peripheries of the hub 55 to prevent leakage therealong.

In operation, when the sleeve 41a is shifted along the shaft 11a, corresponding axial movement of the disc 54 causes axial movements of the rods 51 in unison in their respective hollow spindles 50. This causes rotation of said spindles 50 through the pin and slot connections 52, 53, and corresponding rotations of the valve plates 30 in desired control position.

In all of the forms of couplings so far described, a rotatable receiver 23 is provided to supplement the blocking action of the valve means with the evacuating effect of said receiver. As far as certain aspects of the invention are concerned, the valve means may be applied to a coupling without such a receiver. In Fig. 8, for instance, is shown the embodiment of the valve features of the present invention in a standard form of Vulcan coupling. In this construction, no receiver is provided corresponding to receiver 23 of the other forms described. Therefore, no ducts corresponding to ducts 24, 24a or 24b are provided for passage of liquid from the interior of the core chamber to the outside of the circuit 20. In all other respects, the coupling may be in the form already described, except that the outer casing 21a may have its center section 57 extending inwardly to render the unit more compact.

Although in all of the specific embodiments of the invention shown, the valve plates 30 are rotatably supported on a runner 13, as far as certain aspects of the invention are concerned, these plates may be rotatably supported on the impeller 12.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. A hydraulic coupling of the kinetic type, comprising annular vaned impeller and runner members in dished form, each provided with a ring section co-operating to define therebetween a working circuit for circulation of working liquid therein around a core formed by said ring sections, and an annular series of valve plates between said members, all of said plates lying substantially in a plane at right angles to the axis of the coupling, said plates being rotatable in said plane about separate axes parallel to the axis of the coupling and into position to block passage of working liquid from the outlet of the impeller member to the inlet of the runner member or out of said position, said valve plates at all times being clear of that section of the working circuit between the runner outlet and the opposed impeller inlet.

2. A hydraulic coupling of the kinetic type, comprising annular vaned impeller and runner members in dished form, each provided with a ring section, and co-operating to define therebetween a working circuit, in which working liquid can circulate around a core formed by said ring sections an annular series of valve plates all lying in substantially the same plane at right angles to the axis of the coupling and between said members, each plate being movable in said plane into the path of the working liquid from the outlet of the impeller member to the inlet of the runner member, or to a position entirely within the core, and control means for moving said valves into either of said positions or into intermediate positions, to control the speed of said runner member with respect to said impeller member.

3. A hydraulic coupling of the kinetic type, comprising annular vaned impeller and runner members in dished form, co-operating to define therebetween a working circuit in which working liquid can circulate, an annular series of valve plates between said members and all substantially in a single plane at right angles to the axis of the coupling, spindles connected to said plates, and having their axes substantially parallel to the axis of the coupling, and journalled in one of said members, and control means for rotating said spindles in unison, to move said plates each in its own plane into or out of position between the outlet of the impeller member and opposed inlet of the runner member.

4. A hydraulic coupling of the kinetic type, comprising annular vaned impeller and runner members in dished form, co-operating to define therebetween a working circuit in which working liquid can circulate, valve plates all lying in substantially the same plane at right angles to the axis of the coupling and disposed between said members, and movable in said plane to block or permit passage of working liquid from the outlet of the impeller member to the inlet of the runner member, a slidable control sleeve co-axial with said coupling, and means responsive to axial movement of said sleeve for moving said plates in unison.

5. A hydraulic coupling of the kinetic type, comprising annular vaned impeller and runner members in dished form, each provided with a ring section, co-operating to define therebetween a working circuit in which working liquid can circulate around a core ring formed of said ring sections, a receiver rotatable with one of said members, conduit means carried by one of said members for conducting liquid between said working circuit and said receiver automatically in accordance with the relative speeds of said members, and a series of separate overlapping valve plates movable in a plane substantially at right angles to the axis of the coupling into said core ring or outwardly from it into the section of said circuit between the outlet of the impeller member and opposed inlet of the runner member, for selectively preventing or permitting circulation of working liquid.

6. A hydraulic coupling of the kinetic type, comprising annular vaned impeller and runner members in dished form, co-operating to define therebetween a working circuit in which working liquid can circulate, valve plates annularly arranged in the plane at right angles to the axis of the coupling and between said members, spindles journalled in one of said members and each connected to its respective plate and extending at right angles to the plane of said plate, pinions fixed to said spindles respectively, a spur gear meshing with all of said pinions, and control means for rotating said spur gear to rotate said plates in unison into position between the outlet of the impeller member and opposed inlet of the runner member, or into position clearing said sections to permit passage of working liquid therethrough.

7. A hydraulic coupling of the kinetic type, comprising annular vaned impeller and runner members in dished form, co-operating to define therebetween a working circuit for circulation of working liquid therein, an annular series of valve plates between said members, spindles journalled in one of said members and connected to said plates respectively, rods axially slidable in said spindles, and means for moving said rods axially with respect to said latter member and in unison to rotate said spindles and swing said plates into position between the outlet of the impeller member and opposed inlet of the runner member, or out of said position.

8. A hydraulic coupling of the kinetic type, comprising annular vaned impeller and runner members in dished form, each provided with a ring section, and co-operating to define therebetween a working circuit, in which working liquid can circulate around a core formed by said ring sections, a receiver rotatable with one of said members, an annular series of valve plates disposed substantially in a plane at right angles to the axis of said member, hollow spindles journalled in said member, substantially parallel to said axis and connected to said plates respectively, said spindles extending between said core ring and said receiver, and serving as conduit means for conducting liquid between said working circuit and said receiver, and control means for rotating said spindles in unison, to move said plates into position between the outlet of the impeller member and opposed inlet of the runner member, to block passage of working liquid at said section between said members, or into position clearing said sections to permit passage of working liquid therethrough.

9. A hydraulic coupling of the kinetic type, comprising annular vaned impeller and runner members in dished form, cooperating to define therebetween a working circuit in which liquid may circulate, a reservoir rotatable with one of said members, a series of separate valve plates for controlling the flow of fluid in said circuit, spindles disposed parallel to the axis of the coupling and each connected to a separate one of said valve plates, said spindles having passages therethrough connecting said reservoir and said working circuit, and means for rotating said spindles simultaneously to move said valve plates into or out of flow impeding position.

10. A hydraulic coupling of the kinetic type, comprising annular vaned impeller and runner members in dished form, each provided with a ring section cooperating to define therebetween a working circuit for circulation of a liquid around a core formed by said ring sections, an annular series of valve plates all lying substantially in the same plane at right angles to the axis of the coupling, said plates being normally disposed within said core to permit free circulation of the liquid in the working circuit, and means for positively moving said plates each in its own plane outwardly into position between the outlets of the impeller member and the inlets of the runner member, to impede or substantially prevent flow of liquid from the impeller member into the runner member, said means also operable to move said plates completely into their normal position within the core.

JOHANN NIKOLAUS KIEP.